N. TESLA.
FLOW METER.
APPLICATION FILED DEC. 18, 1916.
1,365,547.
Patented Jan. 11, 1921.
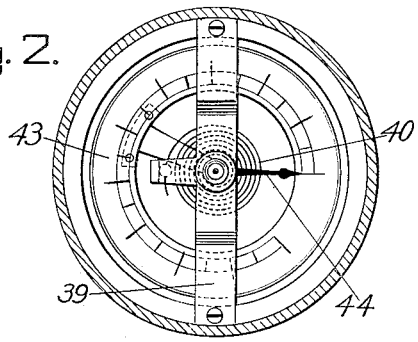
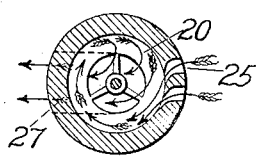
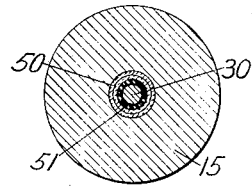
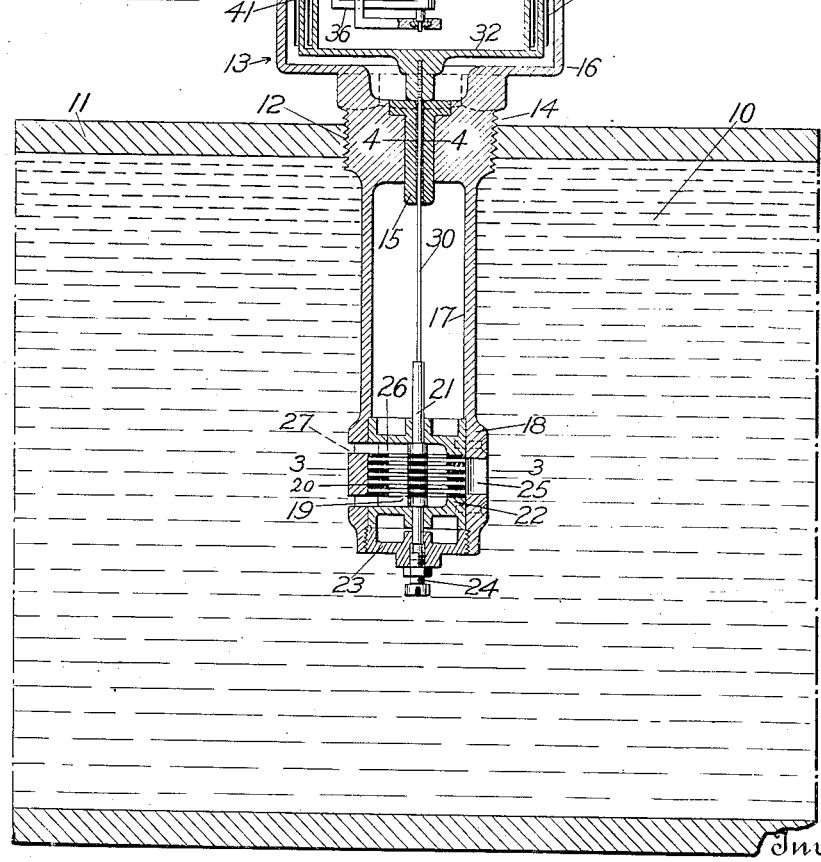
Inventor
Nikola Tesla
By his Attorneys
Forée Bain & May

UNITED STATES PATENT OFFICE.

NIKOLA TESLA, OF NEW YORK, N. Y., ASSIGNOR TO WALTHAM WATCH COMPANY, OF WALTHAM, MASSACHUSETTS, A CORPORATION OF MASSACHUSETTS.

FLOW-METER.

1,365,547.  Specification of Letters Patent.  Patented Jan. 11, 1921.

Application filed December 18, 1916. Serial No. 137,688.

*To all whom it may concern:*

Be it known that I, NIKOLA TESLA, a citizen of the United States, residing at New York, in the county and State of New York, have invented certain new and useful Improvements in Flow-Meters, of which the following is a full, clear, and exact description.

My invention relates to meters for measurement of velocity or quantity of fluid flow. Its chief object is to provide a novel structure, simple, inexpensive and efficient, directly applicable to a conduit through which the fluid flows, and arranged to give instantaneous readings in terms of velocity, or quantity.

In the drawings I have shown a single embodiment of my invention in desirable form, and therein—

Figure 1 is a central, vertical section showing the device in use;

Fig. 2 is a plan detail of the indicating instrument with parts in section;

Fig. 3 is a horizontal section on line 3—3 of Fig. 1, and

Fig. 4 is an enlarged section on line 4—4 of Fig. 1.

Assuming that the flow of liquid 10 through a main 11 is to be measured as in gallons per hour, or feet per second, the main is tapped as at 12 and into the threaded orifice is screwed the body-casting of the flow-meter 13. This casting has a threaded waist 14, centrally apertured to receive the bearing bushing 15, the upper portion of the casting being formed as a shell 16 for incasing the indicating mechanism, and its lower portion prolonged as a tube 17, terminating in a head 18 to receive the flow-driven element. The latter, I prefer, shall be a turbine of the type commonly identified by my name. Illustrating simply its essential elements, the rotor, 19, is made up of centrally apertured parallel disks 20, closely spaced and mounted on a shaft, 21, extending through a shell 22 confined within the head 18 above the plug 23 that closes the bottom of the head and carries an adjustable step-bearing screw 24. Inlet nozzles 25, in the wall of head 18, direct the liquid to the disks tangentially to set the latter in rotation and the water finds escape through the outlet passages 26 of the shell 22 and ports 27 of the head 18. Preferably the length of tube 17 should be such as to dispose the turbine rotor approximately at the center of the main, and of course the turbine will rotate at a rate linearly proportional to the velocity of the fluid at that point, according to a practically-determined constant.

Turbine shaft 21 connects with shaft 30 of the indicator, that preferably is of minimal diameter for the work to be done and that passes through the long bushing 15 for direct connection with the indicator 31. The primary element, 32, of this indicator, directly mounted on said shaft 30, preferably comprises a cup having multiple vertical walls 33 in concentric arrangement, these being interleaved with inverted cup walls 34 of a secondary element 35, that is pivoted and torsionally restrained and that bears a movable element of the reading scale. Specifically, the secondary element may have its inverted cup walls made of very thin aluminum mounted on arm 36, affixed to the spindle 37 that runs in jewel bearings carried by a yoke 38, supported on a bridge piece 39 spanning the casing 16. A coiled spring 40, at one end fast to the spindle 37 and its other end adjustably secured in split stud 41, on bracket 38, resists displacement of the secondary element which carries on its top a reading scale 43, graduated in terms of gallons per hour, feet per minute, or other units of measurement. This dial moves below the stationary pointer 44 that is visible through the sight-glass 45, carried by the cover cap 46 and tightly sealed. By constructing the indicator in accordance with principles fully explained in my Patent No. 1,209,359 the primary element, acting through the viscous or adhesive properties of air or other fluid medium filling the casing, is caused to displace the scale-bearing member against the tension of its spring substantially in linear proportion to the speed of rotation of the primary element, and by observing the conditions requisite to make the torque bear a rigorously linear proportion to the speed, and making the spring to permit deflections proportionate directly to the turning effort, the scale may be graduated uniformly without the employment of any compensating mechanism to this end.

The pressure or density of the gaseous fluid medium in the casing 60 should not be subject to change under varying conditions of pressure within the main, or the readings might be seriously inaccurate; nor, obviously, should escape of the liquid from the main into the indicator casing be permitted. To seal the running bearing of shaft 30 adequately to withstand very considerable pressures, I make what I term a "mercury-lock" by the following provision: the shaft 30 is made of fine steel of great and uniform density and the bushing 15 is preferably of hard copper, these having diameters leaving a clearance of only a few thousandths of an inch,—much too small for the capillary admission of mercury. These surfaces are treated for amalgamation with mercury. The bearing-portion of the shaft 30 is thinly copper plated, and then both bearing surfaces are coated, in a quickening solution, with mercury, after which the mercury-filmed parts are assembled. In this way, as sought graphically and exaggeratedly to be represented in Fig. 4, the mercury body 50 is introduced into the very narrow clearance, and although it is a unitary seal in its resistance to the passage of air or water, it may practically be regarded as forming two mirror-surfaced films between the bushing 15 and the copper plating 51 on shaft 30. I have found such a mercury lock makes a very effective and enduring seal while permitting adequately free rotation of the shaft.

The combination of turbine rotor and air drag indicating mechanism as above described is especially advantageous in that the small turbine, developing a high shaft speed under even rather slow fluid flow, insures that the speeds of the primary element will be ample to result in high torque, so that the indicator may be of relatively rugged construction. Furthermore, the practical insensibility of the air drag instrument to temperature changes, without special compensating mechanism, makes a very simple construction available for many and variant uses. And since linear relationships exist between the rate of liquid flow, turbine-rotation and indicator-displacement, accurate marking of the scale in uniform graduations depends only upon the establishment of certain easily-ascertainable constants for any given conditions.

What I claim is:

1. A flow-meter comprising a body having a pipe engaging portion, a lower head of smaller diameter and an upper casing, a vertical shaft extending through said body, a disk-turbine in said head directly connected with said shaft, said head having inlet and outlet openings to the turbine disks, and indicating means comprising a rotatable primary element directly connected with said vertical shaft and a torsionally-restrained secondary element displaceable by the first and equipped to show its displacement in desired terms.

2. In a device of the character described, the combination of a body fitting having an intermediate part for pipe engagement, a lower head, and an upper shell, a shaft passing vertically from said shell to said head, a pressure-resisting seal for said shaft adjacent said pipe engaging portion of the body, an indicator in said shell comprising a rotatable primary member having a vertical axis and directly connected with the upper end of said shaft, a torsionally-restrained secondary element displaceable by the first, said secondary element associated with a scale for showing its deflections in desired terms, and a horizontal disk-turbine rotor in said head, said rotor directly connected with the bottom of said shaft, said head having inlet and outlet openings to the rotor disk.

In testimony whereof I affix my signature.

NIKOLA TESLA.